United States Patent
Kim et al.

(10) Patent No.: US 7,496,418 B2
(45) Date of Patent: Feb. 24, 2009

(54) AUDIO LEVEL INFORMATION RECORDING/MANAGEMENT METHOD AND AUDIO OUTPUT LEVEL ADJUSTMENT METHOD

(75) Inventors: Yang Gi Kim, Seoul (KR); Jun Hyung Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 779 days.

(21) Appl. No.: 10/809,684

(22) Filed: Mar. 26, 2004

(65) Prior Publication Data
US 2005/0049734 A1 Mar. 3, 2005

(30) Foreign Application Priority Data
Aug. 25, 2003 (KR) .................. 10-2003-0058849

(51) Int. Cl.
*G06F 17/00* (2006.01)
(52) U.S. Cl. ......................... 700/94; 381/107
(58) Field of Classification Search .......... 381/56, 381/104, 106, 107, 109; 700/94
See application file for complete search history.

(56) References Cited

U.S. PATENT DOCUMENTS

| 5,291,462 A | 3/1994 | Richards ................. 369/13 |
| 5,901,119 A | 5/1999 | Inoue ..................... 369/32 |

FOREIGN PATENT DOCUMENTS

| EP | 1 079 535 | 2/2001 |
| EP | 1 107 254 | 6/2001 |
| JP | 2000-173171 | 6/2000 |
| KR | 10-2002-0015578 | 2/2002 |
| WO | WO 02/17146 | 2/2002 |
| WO | WO 02/41319 | 5/2002 |

OTHER PUBLICATIONS

Replay Gain—A proposed Standard. Last updated: Oct. 10, 2001. [Online] [Retrieved on Aug. 6, 2007] <retrieved from URL:http://www.replaygain.org/>, 44 pages.*
Winamp v2.6 screenshots. Software first available Feb. 11, 2000. [Screenshots generated Aug. 5, 2007]. 3 pages.*
XP002302388; M. Nilsson; Main Structure and Native Frames; Nov. 1, 2000.
XP000960419; M. Alexander Broadhead et al.; Direct Manipulation of MPEG Compressed Digital Audio; Nov. 5-9, 1995, pp. 499-507.
Chinese Office Action dated Mar. 9, 2007.
European Search Report dated Nov. 9, 2004.

* cited by examiner

*Primary Examiner*—Walter F Briney, III
(74) *Attorney, Agent, or Firm*—Ked & Associates LLP

(57) ABSTRACT

An apparatus and method for audio level information recording/management and an audio output level adjustment can record or adjust in accordance with a recorded audio file level information. An audio file can be partitioned into a header information area, an audio data area, and a tag information area where audio file level information can be additionally recorded to indicate an output level of audio data to be reproduced. A digital audio system can check audio level information recorded in an audio file requested to be played and adjust the output level of audio data to be reproduced of the audio file on the basis of the checked audio level information additionally or in combination with a user entered audio volume level. Therefore, the output levels of audio data to be reproduced of respective audio files can be directly or automatically adjusted to a desired level.

15 Claims, 8 Drawing Sheets

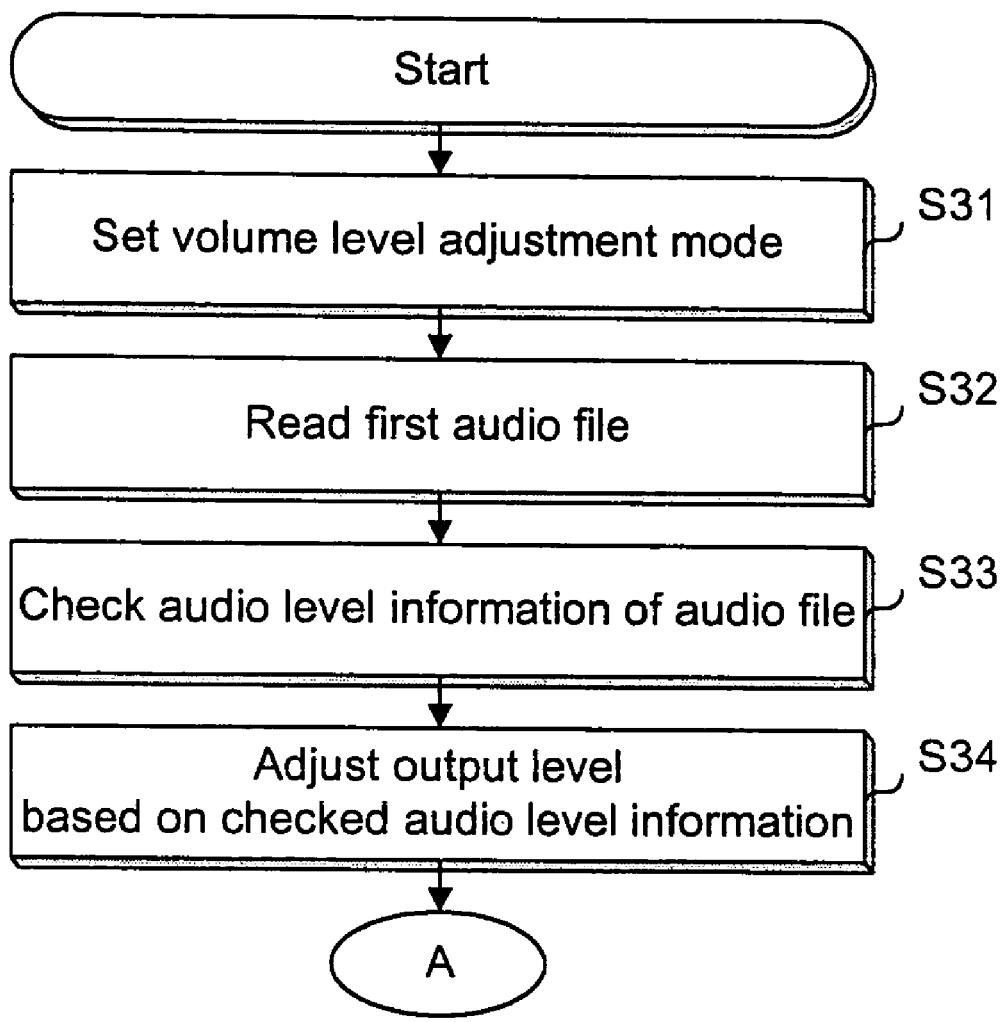

AUDIO LEVEL INFORMATION RECORDING/MANAGEMENT METHOD AND AUDIO OUTPUT LEVEL ADJUSTMENT METHOD

BACKGROUND OF THE INVENTION

1. Field of the Invention

The present invention relates to an apparatus and method for an audio level information recording/management in a digital audio system.

2. Background of the Related Art

As shown in FIG. 1, a digital audio system 100, for example, an MP3 player, has a recording medium 10, a decoder 11, an audio amplifier 12, a microcomputer 13 and an interface 14. The recording medium 10 may be, for example, a flash memory capable of storing MP3 audio files, an optical disk, a hard disk or memory. Each of the MP3 audio files generally includes audio data, and tag information containing various additional information about the audio data, such as music title information Title_Info, singer name information Singer_Info, etc.

The digital audio system 100 can connect with a personal computer (PC) 200 via the interface 14. In response to a user's request, the microcomputer 13 downloads various MP3 audio files provided from the PC 200 or a content provider (CP) server 400 connected via the Internet 300 or the like and stores the downloaded audio files in the recording medium 10. The microcomputer 13 also can search a plurality of MP3 audio files stored in the recording medium 10 for an MP3 audio file whose playback is requested by a user and play the searched MP3 audio file. At this time, the microcomputer 13 adjusts the gain of the audio amplifier 12 based on an audio volume level set by the user to adjust the output level of audio data to be reproduced.

However, as described above, the related art digital audio system and method have various disadvantages. For example, the output levels of audio data to be reproduced of respective MP3 audio files, downloaded from the PC 200 or CP server 400 and stored in the recording medium 10, may be different because of audio recording levels, etc. of the audio files, which were set in the creation, edition or recording processes thereof. As shown in FIG. 2, the user may sequentially play a plurality of exemplary audio files Audio File #1, Audio File #2 and Audio File #3 stored in the recording medium 10 under the condition of adjusting the audio volume level to a value appropriate to the output level of the first audio file (e.g., Audio File #1). In this case, the output levels of the second audio file and third audio file played successively subsequently to the first audio file may be different from that of the first audio file because of their audio recording levels, etc. set in their creation, edition or recording processes. Accordingly, the user has to adjust the audio volume level again.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an audio level information recording/management apparatus and method capable of adjusting an output level of audio data to be reproduced to a desired level for a digital audio system.

Another object of the present invention is to provide an audio level information recording/management apparatus and method capable of adjusting an output level of audio data to be reproduced to a desired level for a digital audio system where the audio data are various audio files downloaded from a personal computer or content provider.

Another object of the present invention is to provide an audio level information recording/management apparatus and method capable of recording audio level information of the audio file in the audio file.

Another object of the present invention is to provide an audio level information recording/management apparatus and method capable of recording audio level information of the audio file in the audio file after determining the audio level information.

In order to achieve at least the above objects and advantages in a whole or in part, in accordance with one aspect of the present invention there is provided a method for recording/managing audio level information that includes partitioning an audio file into a first information area, an audio data area and a second information area, and recording an audio level information in the second information area of an audio file, the audio level information indicating an output level of audio data to be reproduced.

To further achieve at least the above objects in a whole or in part, in accordance with one aspect of the present invention there is provided a method that includes receiving an audio file, checking audio level information recorded in the received audio file, and adjusting an output level of audio data to be reproduced of the received audio file, on the basis of the checked audio level information.

To further achieve at least the above objects in a whole or in part, in accordance with one aspect of the present invention there is provided an article including a machine-readable storage medium containing instructions for adjusting an output level of audio data, the instructions, when executed in a digital audio system, causing the system to search a recording medium for an audio file requested to be played, the recording medium storing a plurality of audio files, check audio level information recorded in the searched audio file, and adjust an output level of audio data to be reproduced of the searched audio file responsive to the checked audio level information.

To further achieve at least the above objects in a whole or in part, in accordance with one aspect of the present invention there is provided a digital audio system that includes recording unit for storing a plurality of audio files, conversion unit for converting an audio file read from the recording unit into audio data to be reproduced, control unit for searching the recording unit for an audio file requested by a user to be played, checking audio level information recorded in the searched audio file and adjusting an output level of audio data to be reproduced of the searched audio file according to the checked audio level information and a user set audio volume level and amplifier unit for amplifying the converted audio data according to the adjusted output level and outputting the amplified audio data.

To further achieve at least the above objects in a whole or in part, in accordance with one aspect of the present invention there is provided an apparatus for adjusting an output level of audio data in a digital audio system, the digital audio system including a recording medium configured to store a plurality of audio files including at least two audio file types, and a converter configured to convert an audio file read from the recording medium into audio data to be reproduced, the apparatus including a controller configured to search the recording medium for an audio file selected for playback, check audio level information recorded in the selected audio file and adjust an output level of audio data to be reproduced of the selected audio file responsive to the checked audio level information, and an audio amplifier configured to amplify the converted audio data and output the amplified audio data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 7a and 7b are flow charts illustrating an embodiment of a procedure of adjusting the output level of an audio file to a value corresponding to an appropriate audio volume level desired by a user according to the present invention.

DETAILED DESCRIPTION OF PREFERRED EMBODIMENTS

Figure 1:
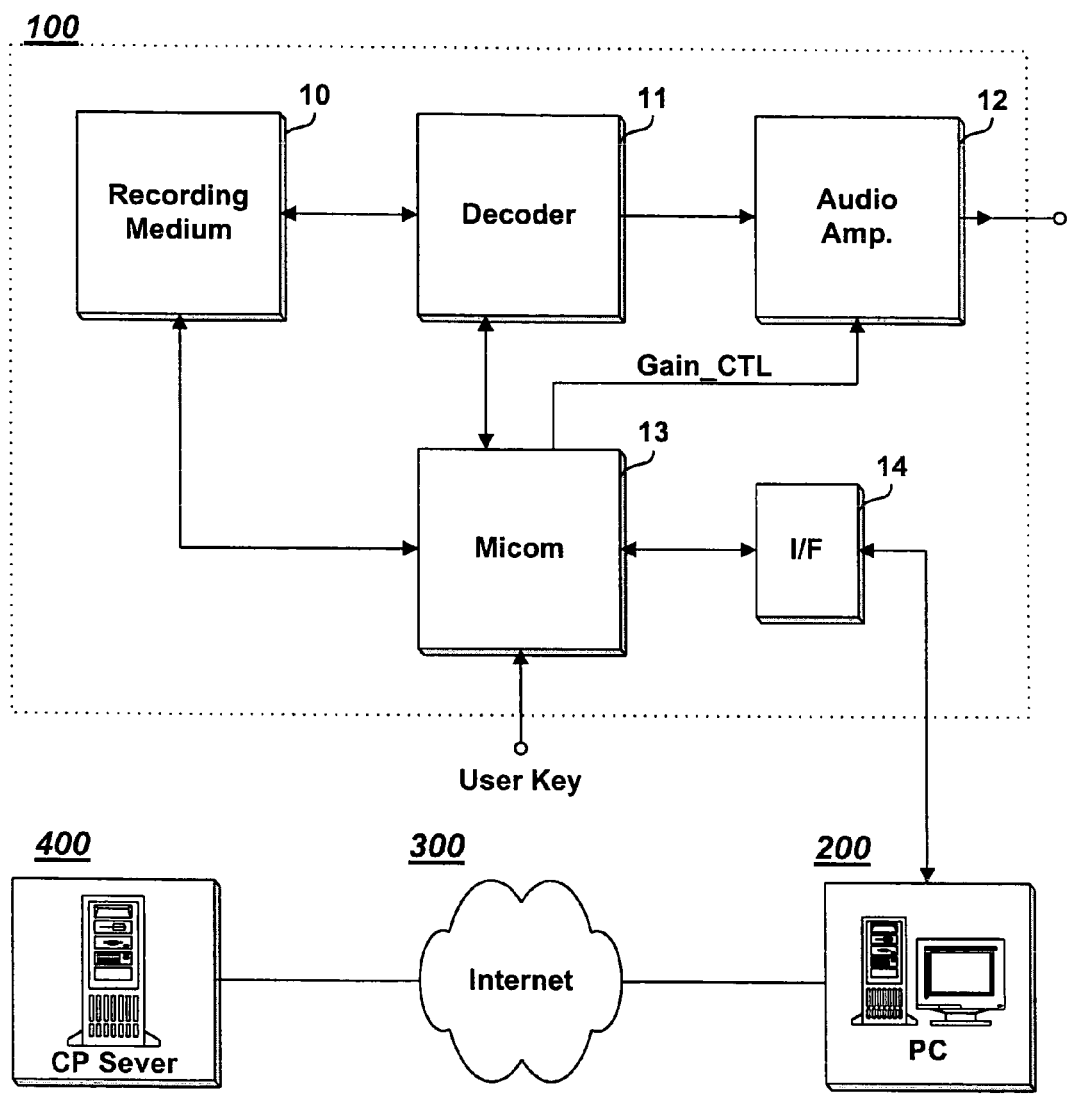
FIG. 1 is a block diagram showing the configuration of a related art digital audio system.
Figure 2:
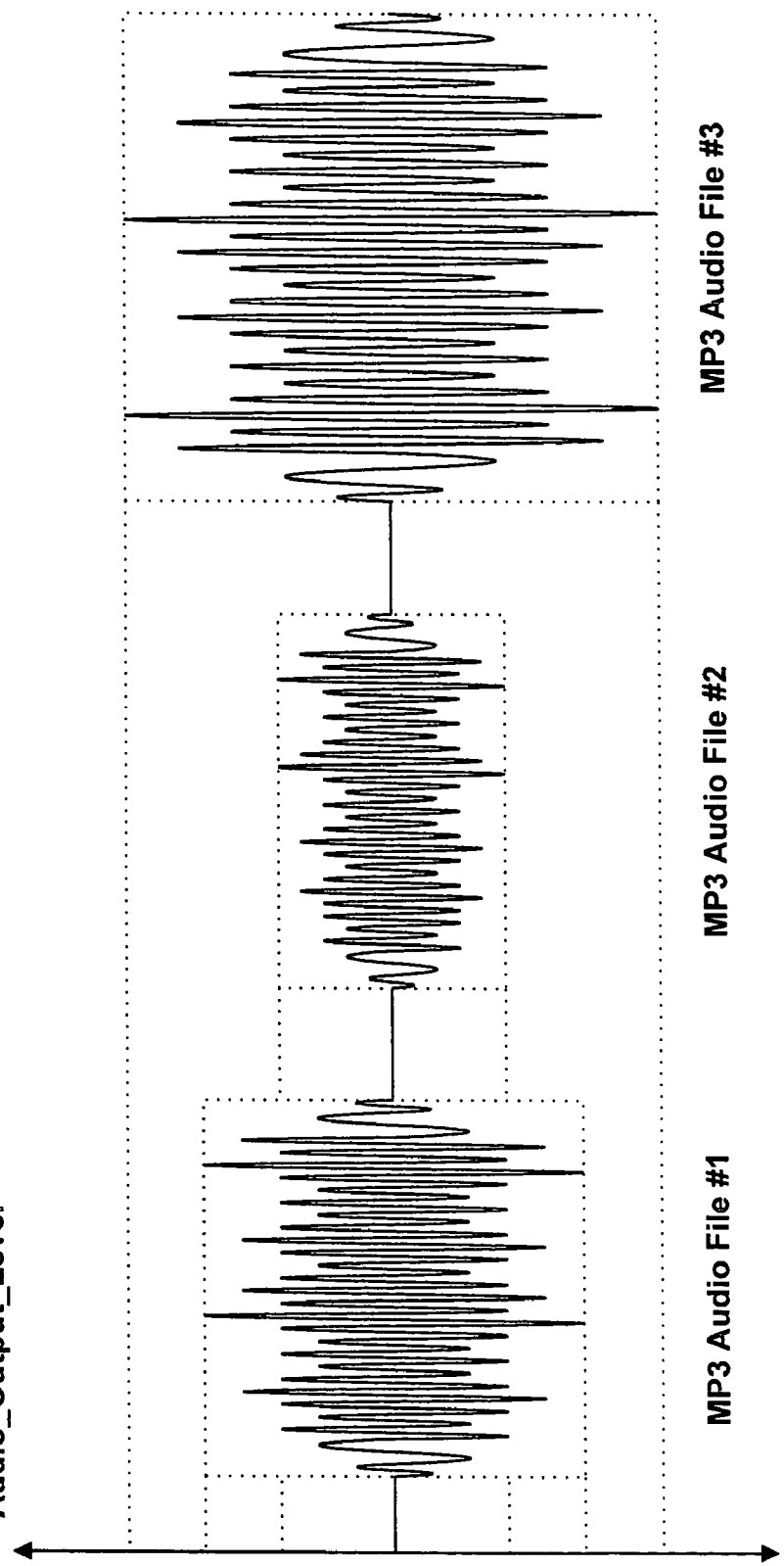
FIG. 2 is a waveform diagram showing the output levels of audio data of respective exemplary audio files reproduced in the related art digital audio system.

Embodiments of apparatus and methods for audio output level adjustment according to the present invention can be applied to various digital audio systems, for example, an MP3 player, or a portable terminal, portable computer, personal computer having a digital audio playback function or the like. Thus, embodiments according to the present invention can be applied to the system of FIG. 1. Further, embodiments according to the present invention, will be described using the digital audio system of FIG. 1. However, the present invention is not intended to be so limited.

Figure 3:
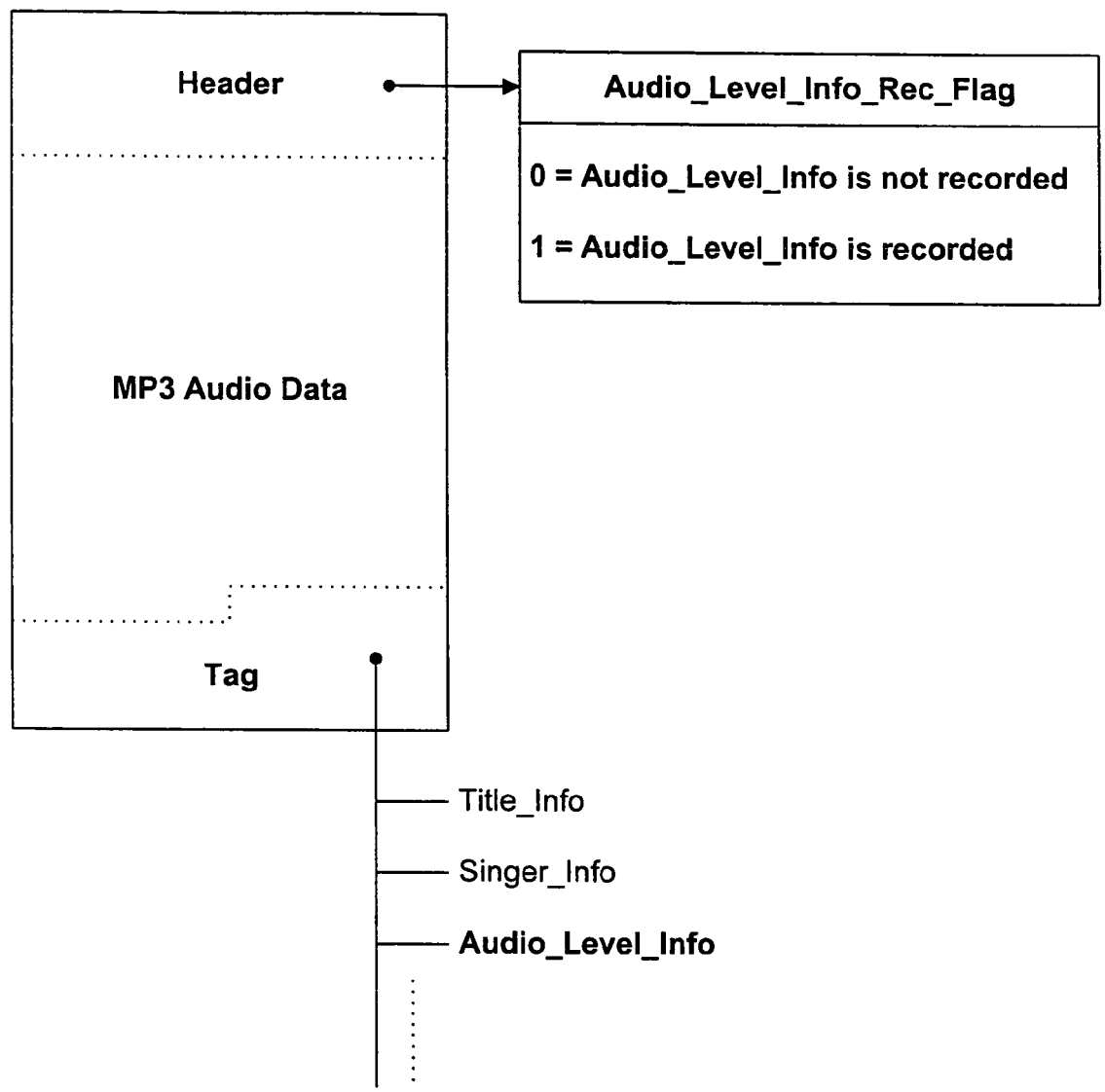
FIG. 3 is a diagram showing an embodiment of an audio file structure according to the present invention.

In an embodiment of an audio file according to the present invention, audio level information can be newly defined and recorded, which can indicate the output level of audio data recorded in the audio file. For example, for an exemplary MP3 audio file, audio level information (e.g., Audio_Level_Info) for adjustment of the output level of audio data to be reproduced of the MP3 audio file can be additionally recorded in tag information along with music title information Title_Info, singer name information Singer_Info, etc., as shown in FIG. 3.

Further, in header information of the audio file, identification information can be newly defined and recorded, which can indicate whether there is audio level information recorded in the tag information. For example, as shown in FIG. 3, an audio level information recording indicator or flag (e.g., Audio_Level_Info_Rec_Flag) recorded in the header information of the MP3 audio file can indicate that there is no audio level information recorded in the tag information if it is a first prescribed value (e.g., '0'), and that there is audio level information recorded in the tag information if it is a second prescribed value (e.g., '1').

Accordingly, a controller (e.g., the microcomputer 13) in the digital audio system can be adapted to, for playback of an audio file selected by the user, optionally check audio level information recorded in tag information of the selected audio file with reference to an audio level information recording flag recorded in header information of the audio file. The controller (e.g., microcomputer 13) can then directly or automatically adjust the gain of the audio amplifier (e.g., the audio amplifier 12) on the basis of the checked audio level information to adjust the output level of audio data (e.g., along with a user set audio volume level) to be reproduced of the audio file to a desired level.

Figure 4:
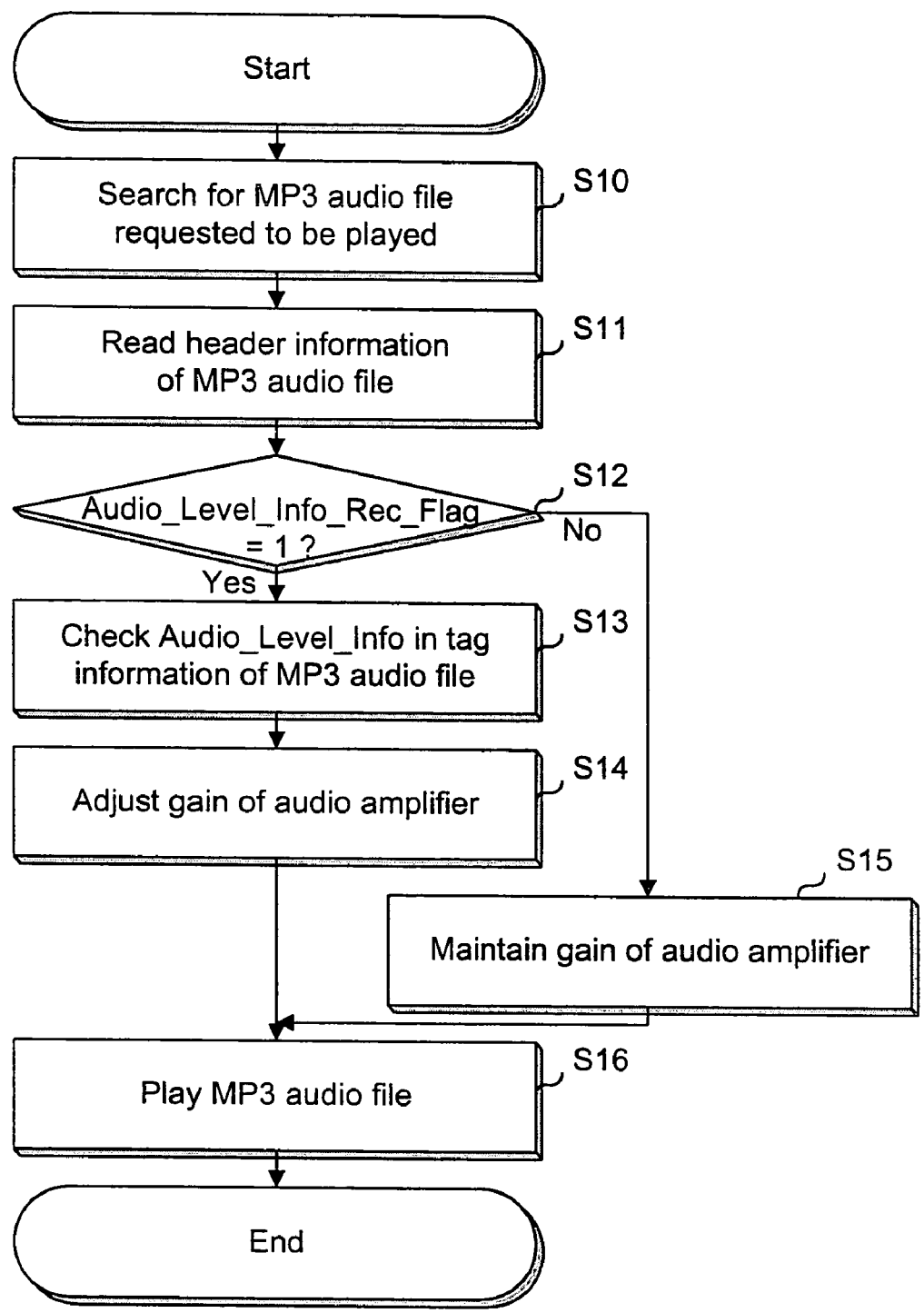
FIG. 4 is a flow chart illustrating an embodiment of an audio output level adjustment method according to the present invention.

FIG. 4 is a flow chart illustrating an embodiment of an audio output level adjustment method according to the present invention. As shown in FIG. 4, after a process starts, the microcomputer 13 can search a plurality of audio files stored in the recording medium 10 for an audio file whose playback is requested by the user (block S10). The microcomputer 13 can read header information of the searched audio file (block S11) to check identification information recorded in the header information indicating whether there is audio level information recorded in tag information of the audio file (block S12).

For example, in the case where the checked identification information is '1' (e.g., true), the microcomputer 13 can determine that there is audio level information recorded in the tag information of the audio file and then check the recorded audio level information (block S13). The microcomputer 13 can adjust the gain of the audio amplifier 12 on the basis of the checked audio level information (block S14). For example, the microcomputer 13 can reduce the gain of the audio amplifier 12 if the value of the audio level information is higher than a predetermined reference level, and increase the gain if the audio level information value is lower than the predetermined reference level.

On the contrary, in the case where the identification information checked from the header information is '0' (e.g., false), for example, the microcomputer 13 can determine that there is no audio level information recorded in the tag information of the audio file. In this case, the microcomputer 13 can maintain the gain of the audio amplifier 12 at a value corresponding to an audio volume level (e.g., adjusted by the user) and omit operations of checking audio level information from the tag information of the audio file (block S15).

Under a condition of adjusting the gain of the audio amplifier 12 or maintaining the gain as it is, the microcomputer 13 can control the decoder 11 to decode the searched audio file into audio data to be reproduced, and the audio amplifier 12 can amplify the decoded audio data at the adjusted gain and output the amplified audio data, for example, to a speaker. Thus, the audio file whose playback is requested by the user can be normally played (block S16).

However, the present invention is not intended to be so limited. For example, alternative methods and apparatus can be used to adjust the gain (or detect and store the audio file level) upon reading the recorded audio level information in the audio file.

In the case where the audio file whose playback is requested by the user is an MP3 audio file, another embodiment of a method may be used to adjust the output level of audio data to be reproduced (e.g., to a predetermined reference level). For the MP3 audio file, an audio signal can be encoded while being decomposed into 32 sub-bands. At this time, information about the signal level of each sub-band can be encoded together. A scale factor can represent the signal level of one sub-band. As a result, when the encoded and recorded audio data is decoded into the original audio data (e.g., decoder 11), the scale factor can act as volume level information for each sub-band used to restore the volume of the audio data to the original audio data. In this regard, for the MP3 audio file, the output level of audio data to be reproduced can be adjusted by adjusting the scale factor, not the gain of the audio amplifier 12.

Figure 5:
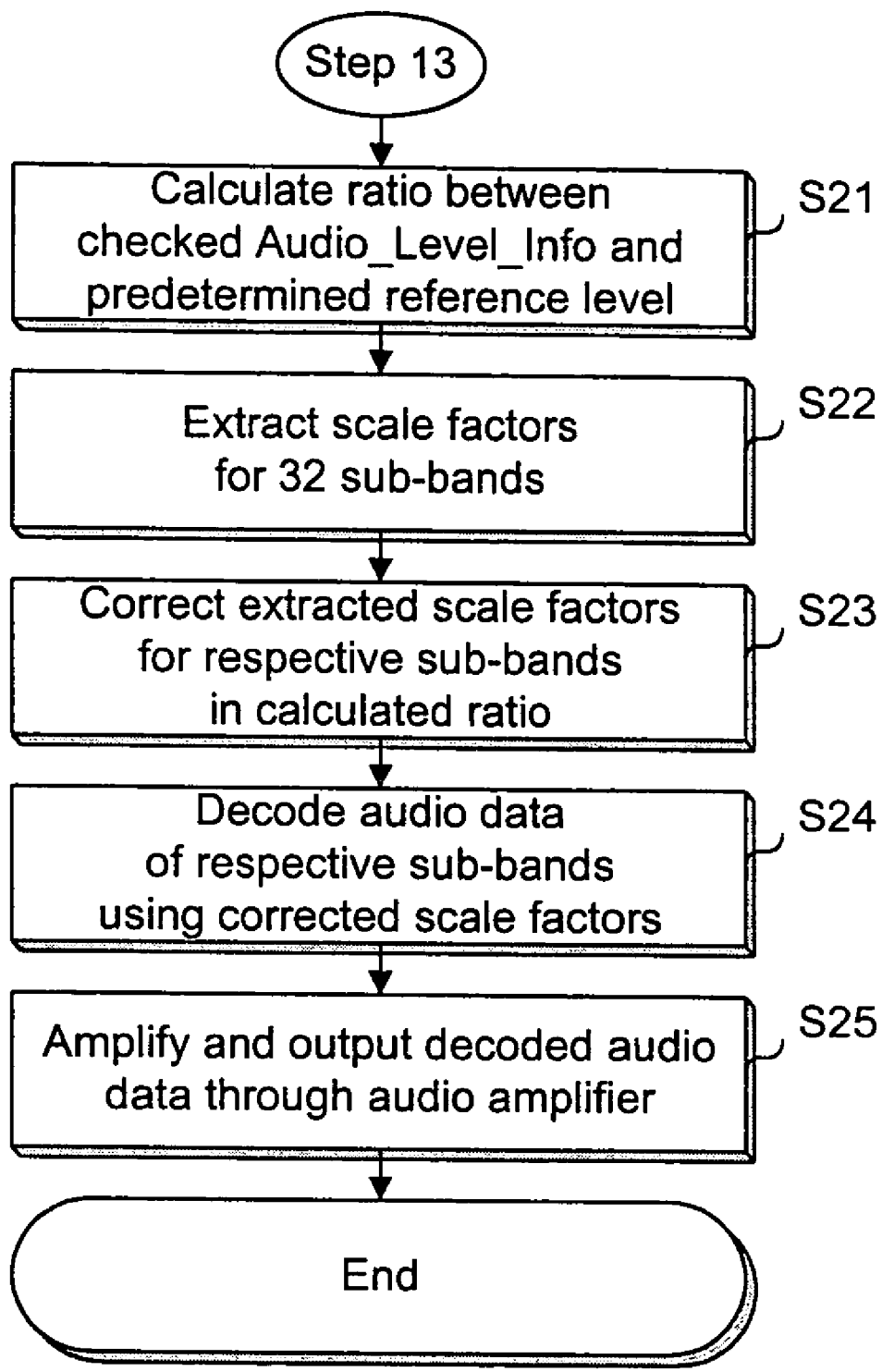
FIG. 5 is a flow chart illustrating an exemplary procedure of adjusting the output level of audio data to be reproduced of an MP3 audio file by correcting scale factors of the MP3 audio file.

FIG. 5 is a flow chart illustrating another embodiment of a method of adjusting the output level of audio data to be reproduced of an MP3 audio file by correcting scale factors of the MP3 audio file. For example, a process described in blocks S21 to S25 in FIG. 5 can replace a process described with respect to blocks S14 and S16 in FIG. 4. The flow chart of claim 5 can be implemented in software.

As shown in FIG. 5, the microcomputer 13 can calculate a ratio between the value of audio level information of the MP3 audio file (e.g., checked at block S13) and the predetermined reference level (block S21). Then, the microcomputer 13 can extract scale factors for 32 sub-bands of the MP3 audio file (block S22) and correct the extracted scale factors for the respective sub-bands in the calculated ratio (block S23). Thereafter, the microcomputer 13 can decode audio data of the respective sub-bands through the decoder 11 on the basis of the corrected scale factors (block S24) and amplify and output the decoded audio data to the speaker through the audio amplifier 12 (block S25). Preferably, operations on audio data such as scale factors of sub-bands of MP3 audio files can be performed (e.g., accumulatively adding to determine average volume levels of sub-bands or bands) on a subset or a sampled ones of the audio data (e.g., not all audio data) to reduce calculation time and processing.

The reference level for comparison with the checked audio level information value may be a value preset in the digital audio system or a user entered value. Further, the reference level can be the average value or the like of audio level information checked from audio files requested to be played.

For example, in the case where a plurality of audio files are requested by the user to be played, the microcomputer 13 can repeat blocks S10 to S13 with respect to the respective audio files to check audio level information of the respective audio files, preferably under the condition that it does not perform the output of audio data to be reproduced of the respective audio files through the audio amplifier 12. The microcomputer 13 can obtain the reference level by calculating the average value of the audio level information of all of the audio files requested to be played. In this case, the microcomputer 13 can temporarily store and use ratios between the checked audio level information values of the respective audio files and the average value of the audio level information of all of the audio files requested to be played. Therefore, for playback of each of the audio files, the microcomputer 13 can adjust the output level of audio data to be reproduced, without repeating blocks S10 to S13 again.

Figure 6:
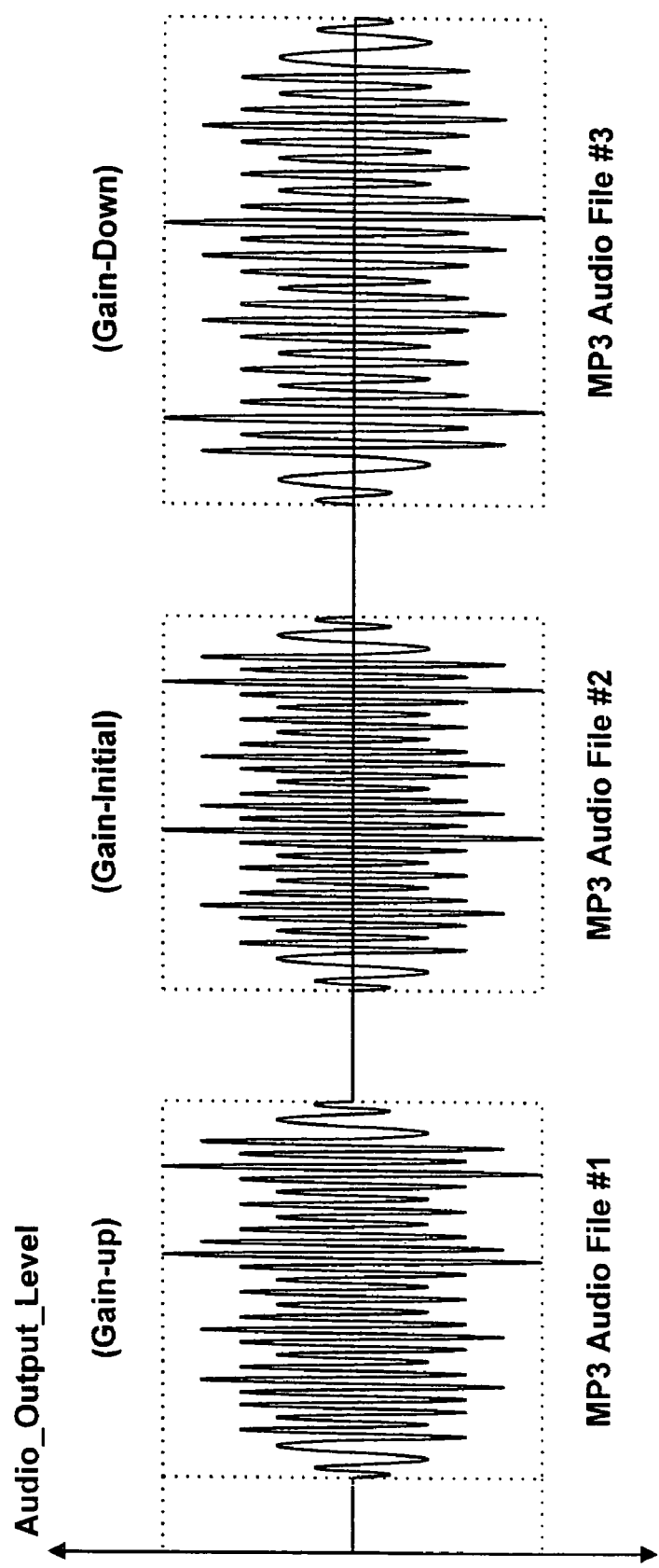
FIG. 6 is a waveform diagram showing the output levels of exemplary audio data of respective audio files reproduced in a digital audio system according to embodiments of the present invention.

As described above, output levels of audio data amplified and prepared to be outputted or outputted through the audio amplifier 12 can be stably maintained at the predetermined reference level. For example, as shown in FIG. 6, in the case where the user sequentially plays a plurality of MP3 audio files MP3 Audio File #1, MP3 Audio File #2 and MP3 Audio File #3 stored in the recording medium 10, the output level of audio data to be reproduced of each of the MP3 audio files can be directly or automatically adjusted with reference to audio level information (e.g., additionally recorded in tag information) of each of the MP3 audio files even though the MP3 audio files have different audio recording levels.

For reference, a digital audio system according to embodiments of the present invention may directly search for audio level information recorded (e.g., in tag information of an audio file), without searching header information of the audio file for identification information indicative of whether there is recorded audio level information. In this case, however, the playback start can be delayed because of an unnecessary audio level information (e.g., tag information) search time when there is no recorded audio level information. For this reason, it is preferable to optionally search for audio level information recorded in the tag information after checking the identification information recorded in the header information.

Figure 7B:
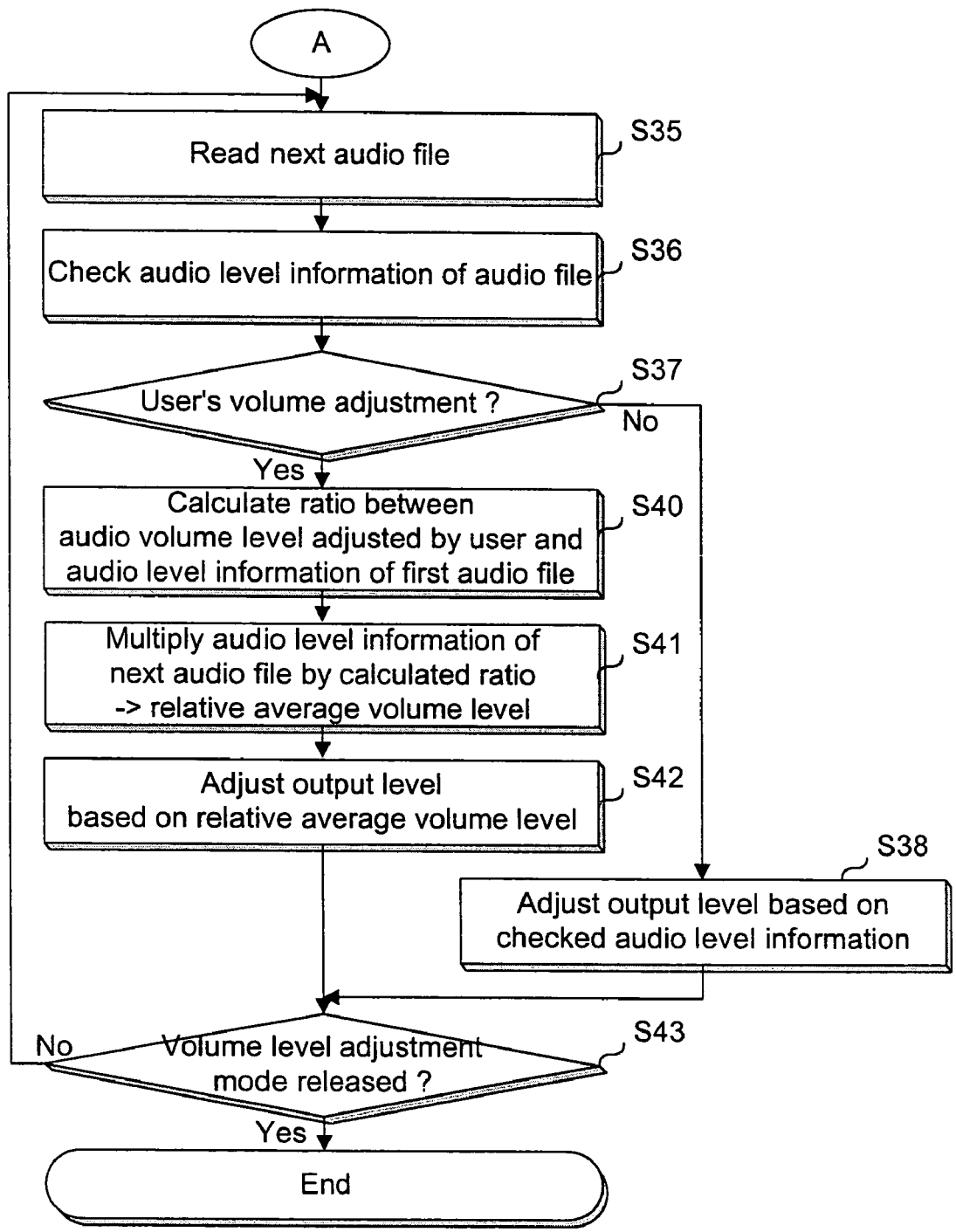

Yet another embodiment of a method of adjusting the output level of audio data to be reproduced, to a value corresponding to an appropriate audio volume level selected or desired by the user, according to the present invention will now be described. As shown in FIGS. 7a and 7b, when an audio file volume level adjustment mode is set in response to the user's request (block S31), the microcomputer 13 can read a first audio file requested to be played (block S32) and check audio level information of the first audio file recorded in tag information thereof preferably under the condition that it does not perform the output of audio data to be reproduced of the first audio file (block S33). Such a procedure can be carried out in the same manner as in blocks S11 to S13 of FIG. 4.

Under the control of the microcomputer 13, for example, the read audio file requested to be played is not immediately amplified and outputted by the audio amplifier 12, but can be temporarily stored in a memory, a buffer or the like. For example, the buffer can temporarily store audio data to be played or reproduced of an amount corresponding to a predetermined period of time (for example, about 2 minutes), a predetermined size or a partial or complete capacity thereof.

Then, the microcomputer 13 can control the decoder 11 to decode the read audio file into audio data to be reproduced, and adjust the output level of the decoded audio data through a comparison between the checked audio level information of the audio file and the predetermined reference level (block S34). This audio data output level adjustment operation can be performed by correcting the audio data to be reproduced using a ratio between the checked audio level information and the predetermined reference level in the process of decoding the read audio file, or adjusting the gain of the audio amplifier 12 using the ratio between the checked audio level information and the predetermined reference level. However, the present invention is not intended to be so limited as other correcting operations may be used.

The microcomputer 13 can read a second audio file requested to be played (block S35) (e.g., preferably under the condition that the playback of the first audio file is not finished) and check an audio level information of the second audio file recorded in tag information thereof (block S36). At this time, the microcomputer 13 can determine whether the user has adjusted an audio volume while the first audio file is played (block S37).

In the case where the audio volume is not adjusted, the microcomputer 13 can control the decoder 11 to decode the read audio file into audio data to be reproduced, and then adjust the output level of the decoded audio data through a comparison between the checked audio level information of the audio file and the predetermined reference level (block S38). On the other hand, in the case where the audio volume is determined to have been adjusted, the microcomputer 13 can calculate a ratio between an audio volume level adjusted by the user and the audio level information of the first audio file (block S40), and can multiply the audio level information of the second audio file by the calculated ratio to obtain a relative volume level (e.g., average) corresponding to the audio volume level desired by the user (block S41). Thereafter, the microcomputer 13 can control the decoder 11 to decode the read audio file into audio data to be reproduced, and then adjusts the output level of the decoded audio data on the basis of the obtained relative average volume level (block S42).

In other words, beginning with the second audio file (e.g., and additional audio files), the microcomputer 13 can repeat operations of adjusting the output level of audio data to be reproduced, on the basis of the relative average volume level reflecting the audio volume level arbitrarily adjusted (e.g., subsequently) by the user. The microcomputer 13 can end operations if the volume level adjustment mode is released (block S43).

As shown in FIGS. 7(a)-7(b), the output level of audio data to be reproduced of an audio file requested to be played can be adjusted to a value corresponding to an appropriate audio volume level desired by the user. The appropriate volume level preferably corrects for an initially recorded level of the audio file and a user adjusted level of audio reproduction.

Although the audio file has been disclosed to be an MP3 audio file for illustrative purposes in some embodiments, it is not limited thereto. For example, the audio file may be an MPEG2 audio file, AC3 audio file, WMV-format audio file, Wave-format audio file or etc.

According to embodiments of the present invention, the average volume level of an audio file may be previously measured and separately stored in a memory of the digital audio system during a recording operation while the playback operation is not performed or the like. In this case, the playback operation can be performed with reference to the stored average volume level of the audio file so that the output level of audio data to be reproduced can be more rapidly adjusted.

Alternatively, a volume level of an audio file (e.g., average volume level) may not be obtained directly in the digital audio system, but can be previously measured and inserted into the format of the audio file during creation of the audio file, during audio reproduction to the digital audio system.

Various software or firmware layers based upon a module or routine format containing application programs, operating system modules, device drivers, BIOS modules and interrupt handlers can be stored in at least one storage medium provided in the digital audio system. The applicable storage media include hard disc drives, compact discs (CDs) or digital versatile discs (DVDs), floppy discs, nonvolatile memories and system memories. The modules, routines or other layers stored in the storage medium contain instructions for allowing the convertible computer system to execute programmed acts when executed.

The software or firmware layers can be loaded on the system by one of various methods. For example, code segments stored in floppy discs, CD or DVD discs or hard discs, or code segments transported through a network interface card, modem or other interface devices can be loaded on the system and can be executed by a corresponding software or firmware layer. In the loading or transporting process, the code segments and data signals carried by a carrier (through a telephone line, a network line, a radio link, a cable, etc.) can be sent to the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of apparatus and methods for audio level information recording/management have various advantages. For example, embodiments of an apparatus and an audio level information recording/management method and audio output level adjustment method can directly or automatically adjust output levels of audio data to be reproduced of respective audio files to a desired level. Thus, output levels of the audio data can be reduced or prevented from becoming different because of audio recording levels, etc. of the audio files set in creation or recording processes thereof.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for adjusting an output level of audio data, comprising:
   receiving an audio file;
   checking audio level information recorded in the received audio file; and
   adjusting an output level of audio data to be reproduced of the received audio file, on the basis of the checked audio level information, wherein the audio file is separated into a header information area, an audio data area, and a tag information area, wherein the audio level information is stored in the tag information area and an audio level information flag is stored in the header information area, and wherein the adjusting comprises:
      comparing the checked audio level information with a predetermined reference level;
      adjusting a gain of the audio data to be reproduced in accordance with the comparison result and an audio volume level set by a user; and
      amplifying and outputting the audio data to be reproduced, at the adjusted gain, wherein the adjusting a gain comprises:
         calculating a ratio between the predetermined reference level, a current audio file, and a next audio file; and
         modifying the gain according to the ratio, wherein the predetermined reference level is an average audio level of audio files requested to be played.

2. The method of claim 1, wherein the checking comprises:
   checking the audio level information flag in the header information area of the received audio file, the audio level information flag indicating whether the audio level information has been recorded in the tag information area of the received audio file; and
   checking the audio level information recorded in the tag information area of the received audio file when the checked audio level information flag indicates that the audio level information was recorded.

3. The method of claim 1, further comprising searching a recording medium for the received audio file that was requested to be played, the recording medium storing a plurality of audio files, wherein the received audio file is any one of an MP3 audio file, MPEG2 audio file, AC3 audio file, WMV-format audio file and Wave-format audio file, wherein the recording medium is any one of a memory, optical disc, and hard disk included in any one of a portable terminal, portable computer, and personal computer having a digital audio playback function.

4. A machine-readable storage medium containing instructions for adjusting an output level of audio data, the instructions, when executed in a digital audio system, causing the system to:
   search a recording medium for an audio file requested to be played, the recording medium storing a plurality of audio files;

check audio level information recorded in the searched audio file; and adjust an output level of audio data to be reproduced of the searched audio file responsive to the checked audio level information, wherein the audio file is separated into a header information area, an audio data information area, and a tag information area, wherein the audio level information is recorded in the tag information area and an audio level information flag is recorded in the header information, and wherein the instructions cause the system to:

compare the checked audio level information with a predetermined reference level;

adjust a gain of the audio data to be reproduced in accordance with the comparison result and an audio volume level set by a user; and amplify and output the audio data to be reproduced, at the adjusted gain, wherein the adjusting a gain comprises:

calculating a ratio between the predetermined reference level, a current audio file, and a next audio file; and modifying the gain according to the ratio, wherein the predetermined reference level is an average audio level of audio files requested to be played.

5. The medium of claim 4, wherein the searched audio file is any one of an MP3 audio file, MPEG2 audio file, AC3 audio file, WMV-format audio file, and Wave-format audio file, wherein the recording medium is any one of a memory, optical disc, and hard disk included in any one of a portable terminal, portable computer, and personal computer having a digital audio playback function.

6. The medium of claim 4, further containing instructions for causing the system to:

check for the audio level information flag in the header information area of the searched audio file, the audio level information flag indicating whether the audio level information has been recorded in the tag information area of the searched audio file; and optionally check the audio level information recorded in the tag information of the searched audio file on the basis of the checked audio level information flag.

7. A digital audio system, comprising:

a recording device configured to store a plurality of audio files;

a converter configured to convert an audio file read from the recording device into audio data to be reproduced;

a controller configured to search the recording device for an audio file requested by a user to be played, check audio level information recorded in the searched audio file, and adjust an output level of audio data to be reproduced of the searched audio file according to the checked audio level information and a user set audio volume level; and an amplifier configure to amplify the converted audio data according to the adjusted output level and output the amplified audio data, wherein the controller is configured to compare the checked audio level information with a predetermined reference level and adjust the gain of the audio amplifier in accordance with the comparison result and a system audio volume level to adjust the output level of the audio data to be reproduced, and wherein the predetermined reference level is an average audio level of audio files requested to be played.

8. The system of claim 7, wherein the digital audio system is any one of a portable terminal, a portable computer, and a personal computer having a playback function for the audio files, and wherein the searched audio file is any one of an MP3 audio file, MPEG2 audio file, AC3 audio file, WMV-format audio file and Wave-format audio file.

9. The system of claim 7, comprising:

an interfacing device configured to interface to a personal computer or contents provider server in order to download the audio files.

10. The system of claim 7, wherein the audio level information is recorded in a tag information of the searched audio file, and wherein the searched audio file includes a header information area, the header information area containing an audio level information flag indicative of whether the audio level information has been recorded in the tag information of the searched audio file.

11. The system of claim 10, wherein the controller is configured to first check the audio level information flag and selectively check the audio level information recorded in the tag information of the searched audio file on the basis of the checked audio level information flag.

12. An apparatus for adjusting an output level of audio data in a digital audio system, the digital audio system including a recording medium configured to store a plurality of audio files including at least two audio file types, and a converter configured to convert an audio file read from the recording medium into audio data to be reproduced, the apparatus comprising:

a controller configured to search the recording medium for an audio file selected for playback, check audio level information recorded in the selected audio file, and adjust an output level of audio data to be reproduced of the selected audio file responsive to the checked audio level information; and an audio amplifier configured to amplify the converted audio data and output the amplified audio data, wherein the controller is configured to compare the checked audio level information with a predetermined reference level and adjust the gain of the audio amplifier in accordance with the comparison result and a user set audio volume level, and wherein the predetermined reference level is an average audio level of audio files requested to be played, and wherein the audio level of the audio files is a peak level or an average level of the audio data to be reproduced for each audio file.

13. The apparatus of claim 12, comprising a speaker to broadcast the amplified audio data, wherein the selected audio file is any one of an MP3 audio file, MPEG2 audio file, AC3 audio file, WMV-format audio file and Wave-format audio file.

14. The apparatus of claim 12, wherein the audio level information is recorded in a tag information area of the searched audio file.

15. The apparatus of claim 14, wherein the searched audio file includes a header information area, the header information area containing an audio level information flag indicative of whether the audio level information has been recorded in the tag information area of the searched audio file, and wherein the controller is configured to first check the audio level information flag and check the audio level information recorded in the tag information area of the searched audio file when the audio level identification information tag indicates that the audio level information was recorded.

* * * * *